United States Patent [19]

Ito et al.

[11] Patent Number: 5,155,629
[45] Date of Patent: Oct. 13, 1992

[54] ZOOM LENS SYSTEM

[75] Inventors: Takayuki Ito; Nobutaka Minefuji, both of Tokyo, Japan

[73] Assignee: Asahi Kogaku Kogyo K.K., Tokyo, Japan

[21] Appl. No.: 782,738

[22] Filed: Oct. 28, 1991

Related U.S. Application Data

[63] Continuation of Ser. No. 683,625, Apr. 11, 1991, abandoned.

[30] Foreign Application Priority Data

Apr. 17, 1990 [JP] Japan .................... 2-102186

[51] Int. Cl.$^5$ .......................................... G02B 15/00
[52] U.S. Cl. ..................... 359/676; 359/680; 359/691; 359/692
[58] Field of Search ............ 350/423, 427, 426; 359/676, 680, 683, 691, 666

[56] References Cited

U.S. PATENT DOCUMENTS

| 3,771,853 | 11/1973 | Nakamura . | |
|---|---|---|---|
| 4,147,410 | 4/1979 | Shimomura et al. . | |
| 4,364,641 | 12/1982 | Mogami | 350/426 |
| 4,380,375 | 4/1983 | Mogami | 350/426 |
| 4,523,813 | 6/1985 | Ogata . | |
| 4,540,249 | 9/1985 | Mogami | 350/426 |
| 4,647,160 | 3/1987 | Ikemori . | |
| 4,726,665 | 2/1988 | Itoh | 350/423 |

FOREIGN PATENT DOCUMENTS

| 63-265211 | 11/1988 | Japan . |
| 2016733A | 9/1979 | United Kingdom . |
| 2090999A | 7/1982 | United Kingdom . |

OTHER PUBLICATIONS

European Search Report 9107969.9–dated Jul. 19, 1991.

*Primary Examiner*—Paul M. Dzierzynski
*Assistant Examiner*—Hung Xuan Dang
*Attorney, Agent, or Firm*—Sughrue, Mion, Zinn, Macpeak & Seas

[57] ABSTRACT

A zoom lens system comprising, in order from the object side, a first lens group that includes at least three lens elements and that has a negative overall power and a second lens group that includes at least four lens elements, with the negative lens element of the greatest powre being cemented to the adjacent positive lens element, and that has a positive overall power. The zoom lens system is capable of changing its focal length by adjusting the distance between the first and second lens groups. The zoom lens system satisfies the specific conditions.

4 Claims, 12 Drawing Sheets

ZOOM LENS SYSTEM

This is a continuation of application Ser. No. 07/683,625 filed Apr. 11, 1991, now abandoned.

This application is based on and claims priority from Japanese Patent Application No. Hei. 2-102186 filed Apr. 17, 1990, the disclosure of which is incorporated by reference herein.

BACKGROUND OF THE INVENTION

The present invention relates to a zoom lens system suitable for use with video cameras, electronic still cameras, etc. that has a brightness $F_{NO}$ of about 1:2.8 at the wide-angle end and which is capable of zooming up to a ratio of about 3.

As active efforts are being made to a reduce the size, weight and cost of video cameras and electronic still cameras, there is a growing need for correspondingly reducing the size, weight and cost of the optical system for use in those devices.

Compact and lightweight zoom lens systems have been used with still cameras for silver halide photography and they are mostly available as a "two-group" zoom lens system that comprises, in order from the object side, the first lens group having a negative power and the second lens group having a positive power, and that performs zooming by changing the distance between the two lens groups.

An example of the two-group zoom lens system for use with video cameras and electronic still cameras is described in Unexamined Published Japanese Patent Application No. 265211/1988.

However, these conventional two-group zoom lens systems are only capable of achieving a zoom ratio of up to about 2 and are unable to meet the demand of recent versions of video cameras and electronic still cameras for achieving higher zoom ratios. In order to achieve zoom ratios higher than 2, one may use a zoom lens system consisting of three or more lens groups but then the increase in the complexity of the system is inevitable and the demand for smaller size, lighter weight and lower cost cannot be fully met.

SUMMARY OF THE INVENTION

The present invention has been accomplished under these circumstances and has an object providing a compact, lightweight and low-cost zoom lens system that features a simple two-group lens configuration and which yet is capable of zooming up to a ratio of about 3 while exhibiting satisfactory optical performance.

This object of the present invention can be attained by a zoom lens system that comprises, in order from the object side, a first lens group that includes at least three lens elements and that has a negative overall power and a second lens group that includes at least four lens elements, the second lens group being composed, in order from the object side, a positive lens unit, a cemented lens having a positive lens element and a negative lens element and a positive lens element, and that has a positive overall power, the zoom lens system being capable of changing its focal length by adjusting the distance between the first and second lens groups, and the zoom lens system satisfying the following conditions (a) and (b):

$$0.05 < n_N - n_P < 0.25 \quad (a)$$

$$10 < \nu_P - \nu_N < 35 \quad (b)$$

where $n_P$ is the refractive index at the d-line of the positive lens element of the cemented lens in the second lens group, $n_N$ is the refractive index at the d-line of the negative lens element of the cemented lens in the second lens group, $\nu_P$ is the Abbe number of the cemented positive lens element at the d-line, and $\nu_N$ is the Abbe number of the cemented negative lens element at the d-line.

In a preferred embodiment, this zoom lens system satisfies the following additional condition (c):

$$0.5 < |r_C/f2| < 10 \quad (c)$$

where f2 is the focal length of the second lens group and $r_C$ is the radius of curvature of the interface between the positive and negative lens elements of the cemented lens in the second lens group.

In another preferred embodiment of this zoom lens system, the first lens group comprises, in order from the object side, a negative meniscus lens element having a convex surface directed toward the object, a negative lens element and a positive lens element, said second lens group comprising, in order from the object side close to the first lens group, a positive lens unit, a cemented lens consisting of a positive and a negative lens element, and a positive lens element, said zoom lens system further satisfying the following conditions (d) and (e):

$$1.2 < |f1/fw| < 1.9 \quad (d)$$

$$(n1 + n2)/2 < 1.7 \quad (e)$$

where fw is the focal length of the overall system at the wide-angle end, f1 is the focal length of the first lens group, and n1 and n2 are the refractive indices at the d-line of the two negative lens elements in the first lens group, with n1 referring to the lens element which is the closer to the object.

BRIEF DESCRIPTION OF THE DRAWINGS

FIGS. 1-24 show Examples 1-6 of the zoom lens system of the present invention, in which:

FIGS. 1, 5, 9, 13, 17 and 21 are simplified cross-sectional views of the lens groups used in Examples 1-6, respectively;

FIGS. 2, 6, 10, 14, 18 and 22 are graphs showing the aberration curves obtained at the wide-angle end in Examples 1-6, respectively;

FIGS. 3, 7, 11, 15, 19 and 23 are graphs showing the aberration curves obtained at the middle-angle end in Examples 1-6, respectively; and FIGS. 4, 8, 12, 16, 20 and 24 are graphs showing the aberration curves obtained at the telephoto end in Examples 1-6, respectively.

DETAILED DESCRIPTION OF THE CONDITIONS

Figure 1:
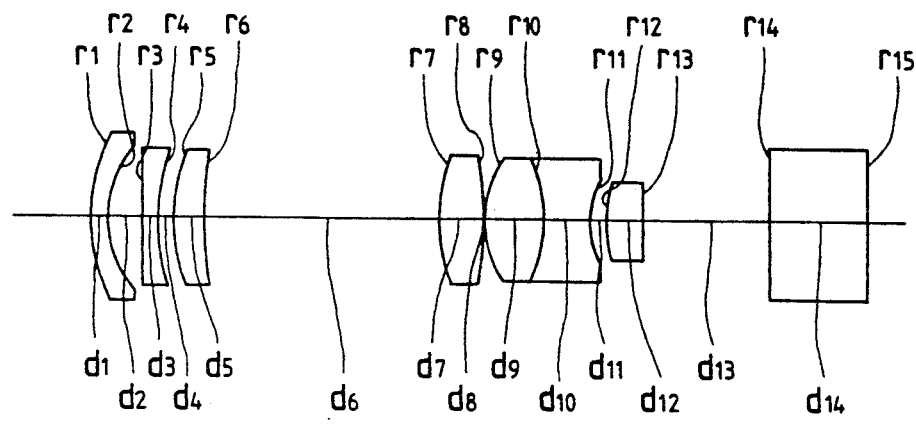

The conditions (a)-(e) which should be, or are preferably, satisfied by the zoom lens system of the present invention are described below.

Condition (a) relates to the difference between the refractive indices of the two elements of the cemented lens in the second lens group. By combining two optical materials for the cemented lens that satisfy the range of the condition (a), spherical aberration, coma and astigmatism can be compensated in a balanced way. If the lower limit of this condition is not reached, spherical aberration is undercompensated and, at the same time, coma will increase. If the upper limit of condition (a) is exceeded, it becomes difficult to reduce the curvature of field and astigmatism.

Condition (b) relates to the difference between the Abbe numbers of the two elements of the cemented lens in the second lens group and should be satisfied in order to achieve effective compensation for the chromatic aberration that occurs in the second lens group. By combining the Abbe numbers of the two elements of the cemented lens in such a way as to satisfy condition (b), chromatic aberration can be reduced. If the lower of this condition is not reached or if its upper limit is exceeded, it becomes difficult to achieve effective compensation for axial (or longitudinal) chromatic aberration and, in particular, the chromatic aberration of magnification (or lateral chromatic aberration) at the wide-angle end.

Condition (c) relates to the radius of curvature of the interface between the two elements of the cemented lens in the second lens group. The cemented lens in the second lens group consists of a positive and a negative lens element having respectively strong positive and a negative power in order to realize a compact lens system. The use of this cemented lens helps reduce the adverse effects of manufacturing errors in lens working. In addition, by adjusting the radius of curvature of the interface of the cemented lens in such a way as to satisfy the range of condition (c), spherical aberration and coma can be effectively compensated. If the lower limit of condition (c) is not reached, the radius of curvature the interface of the cemented lens is so small that spherical aberration and coma will increased markedly. If the upper limit of this condition is exceeded, spherical aberration will be undercompensated and, at the same time, undesirably great aberrational variations will occur during zooming.

Condition (d) relates to the power of the first lens group and is preferably satisfied not only to reduce the amount of movement of the first lens group during zooming so as to realize a compact lens system but also to insure a sufficient back focus for insertion of a filter and a faceplate in video cameras or electronic still cameras. If the lower limit of condition (d) is not reached, the power of the first lens group will increase, providing a favorable condition for realizing a compact system, but, on the other hand, it becomes difficult to reduce spherical aberration and distortion. If the upper limit of condition (d) is exceeded, the power of the first lens group will decrease, making it possible to effectively compensate for spherical aberration and distortion but, on the other hand, it becomes difficult to allow a long back focus and, at the same time, the amount of movement of the first lens group during zooming will increase, which is not preferred for the purpose of realizing a compact system.

Condition (e) relates to the refractive indices of the negative lens elements in the first lens group and it is preferably satisfied in order to maintain the Petzval sum of the overall system at a desired level and to achieve effective compensation for the curvature of field and astigmatism. The first lens group of the system of the present invention has a strong negative power, so the overall lens system has a negative Petzval sum and the curvature of field tends to be overcompensated. To avoid this problem, the refractive indices of the negative lens elements in the first lens group are set at sufficiently high levels to insure that the negative Petzval sum which occurs in the first lens group is reduced to shift the Petzval sum of the overall system in the positive direction, whereby the curvature of field and astigmatism can be compensated in a balanced way.

EXAMPLES

Four examples of the present invention are described below with reference to numerical data sheets, in which $F_{NO}$ represents the aperture ratio, f, the focal length of the overall system, $\omega$, the half view angle, r, the radius of curvature of an individual lens surface, d, the thickness of an individual lens element or the aerial distance between adjacent elements, n, the refractive index of an individual lens element at the d-line, and $\nu$, the Abbe number of an individual lens element at the d-line.

The numerical data sheet for each example contains a plane parallel plate that is positioned the closest to the image point and this plate is an assumed combination of a filter, a faceplate and like components to be used with a video camera, an electronic still camera, etc. The second surface of the plane parallel plate coincides with the focal position.

EXAMPLE 1

Figure 2:
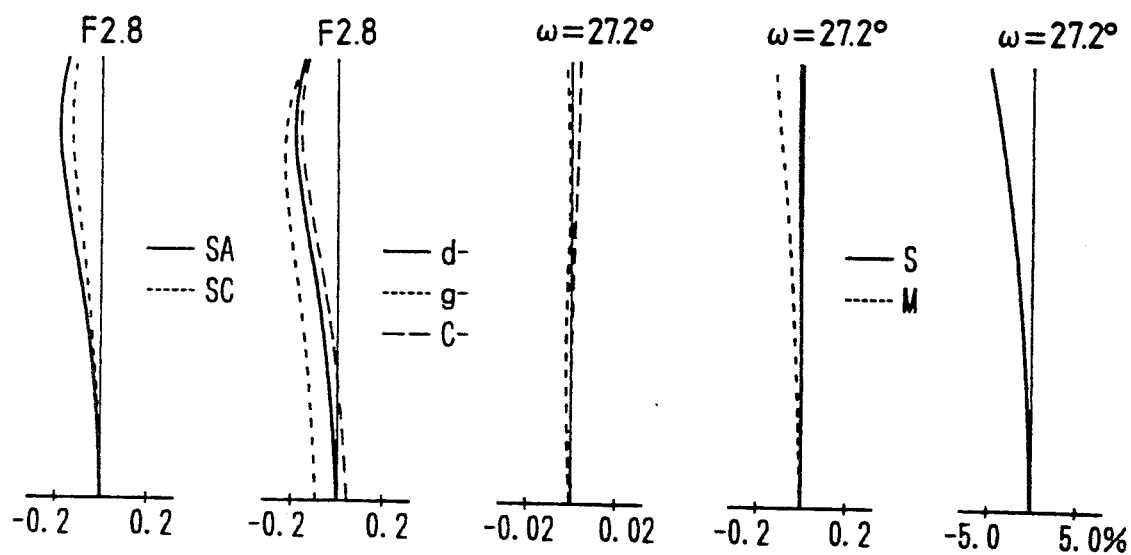
Figure 3:
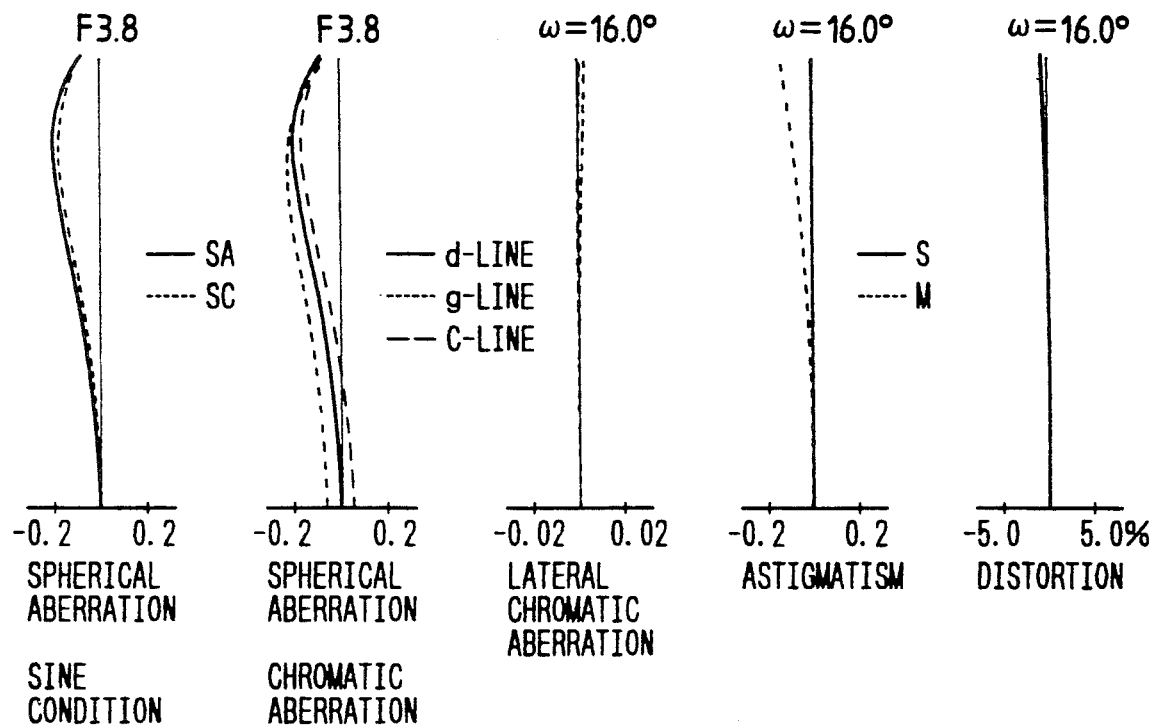
Figure 4:
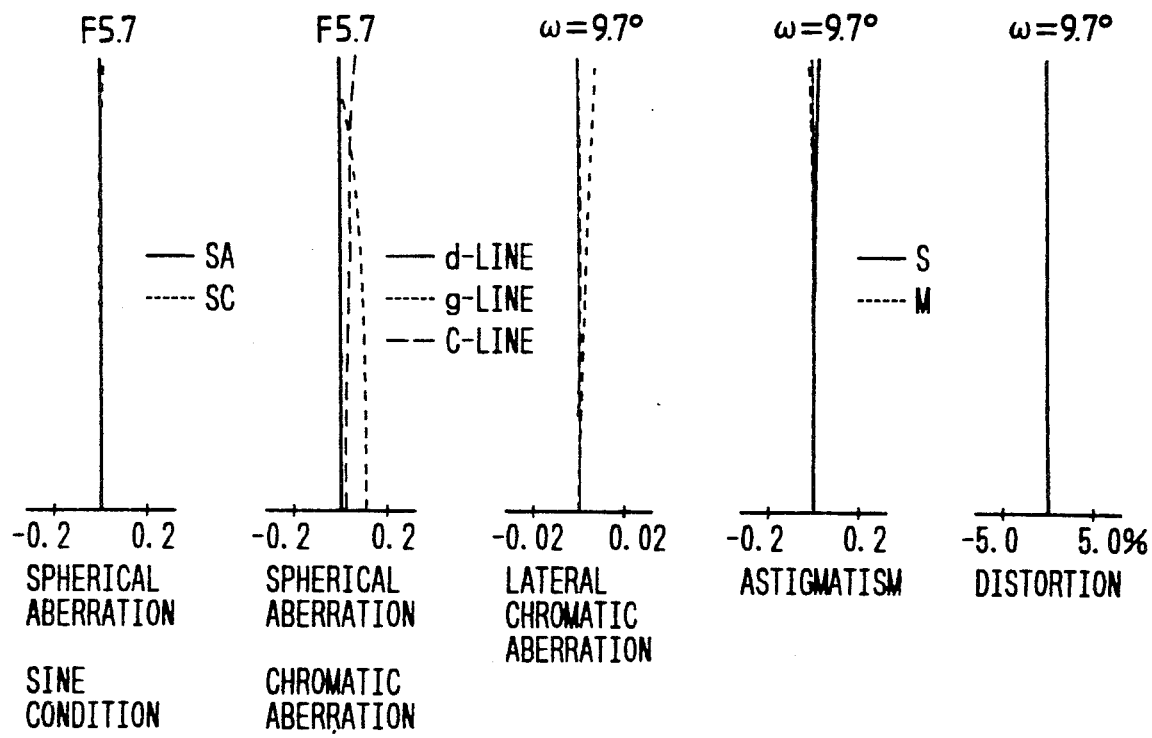

FIG. 1 is a simplified cross-sectional view of a zoom lens system according to Example 1 of the present invention. Numerical data for this lens system are shown in Table 1 below. FIG. 2 is a graph showing the aberration curves obtained with this lens system at the wide-angle end; FIG. 3 is a graph showing the aberration curves obtained at the middle-angle end; and FIG. 4 is a graph showing the aberration curves obtained at the telephoto end.

TABLE 1

| $F_{NO}$ = 1:2.8–5.7, f = 8.15–23.50, $\omega$ = 27.2°–9.7° | | | | |
|---|---|---|---|---|
| Surface No. | r | d | n | νd |
| 1 | 10.707 | 0.80 | 1.83481 | 42.7 |
| 2 | 5.583 | 1.80 | | |
| 3 | 288.549 | 0.80 | 1.83481 | 42.7 |
| 4 | 10.901 | 0.76 | | |
| 5 | 8.839 | 1.58 | 1.80518 | 25.4 |
| 6 | 20.856 | variable | | |
| 7 | 10.186 | 2.16 | 1.48749 | 70.2 |
| 8 | −23.485 | 0.10 | | |
| 9 | 6.789 | 3.02 | 1.72000 | 50.3 |
| 10 | −8.139 | 2.29 | 1.83400 | 37.2 |
| 11 | 4.140 | 0.85 | | |
| 12 | 7.092 | 1.82 | 1.56873 | 63.2 |
| 13 | −281.149 | variable | | |
| 14 | ∞ | 5.00 | 1.51633 | 64.1 |
| 15 | ∞ | | | |
| The values of d6 and d13 will vary as follows. | | | | |
| $F_{NO}$ | 1:2.8 | 1:3.8 | 1:5.7 | |
| f | 8.15 | 14.00 | 23.50 | |
| $\omega$ | 27.2° | 16.0° | 9.7° | |
| d6 | 11.97 | 5.91 | 2.50 | |
| d13 | 6.44 | 11.48 | 19.68 | |

EXAMPLE 2

Figure 5:
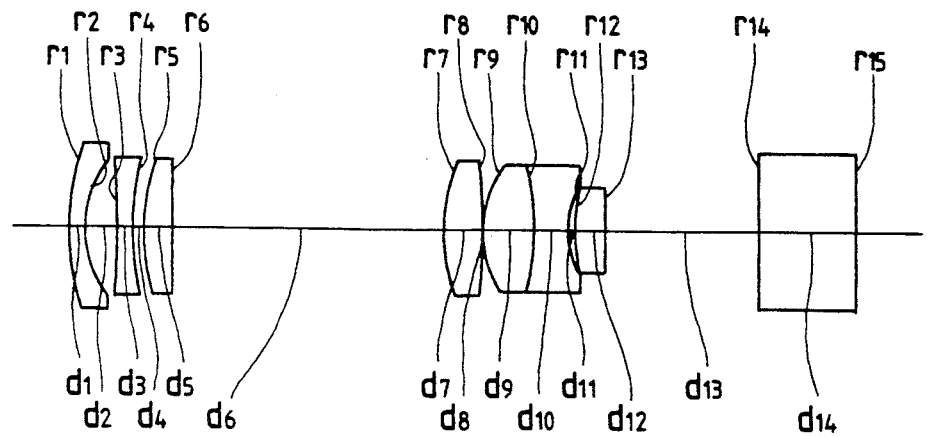
Figure 6:
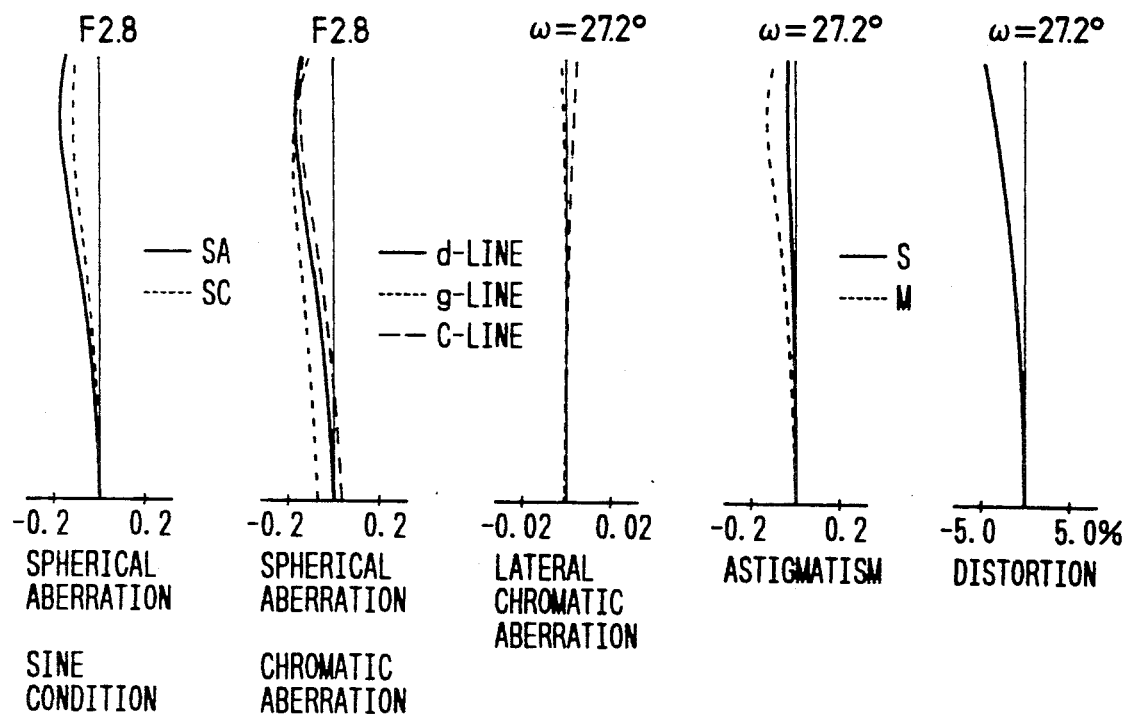
Figure 7:
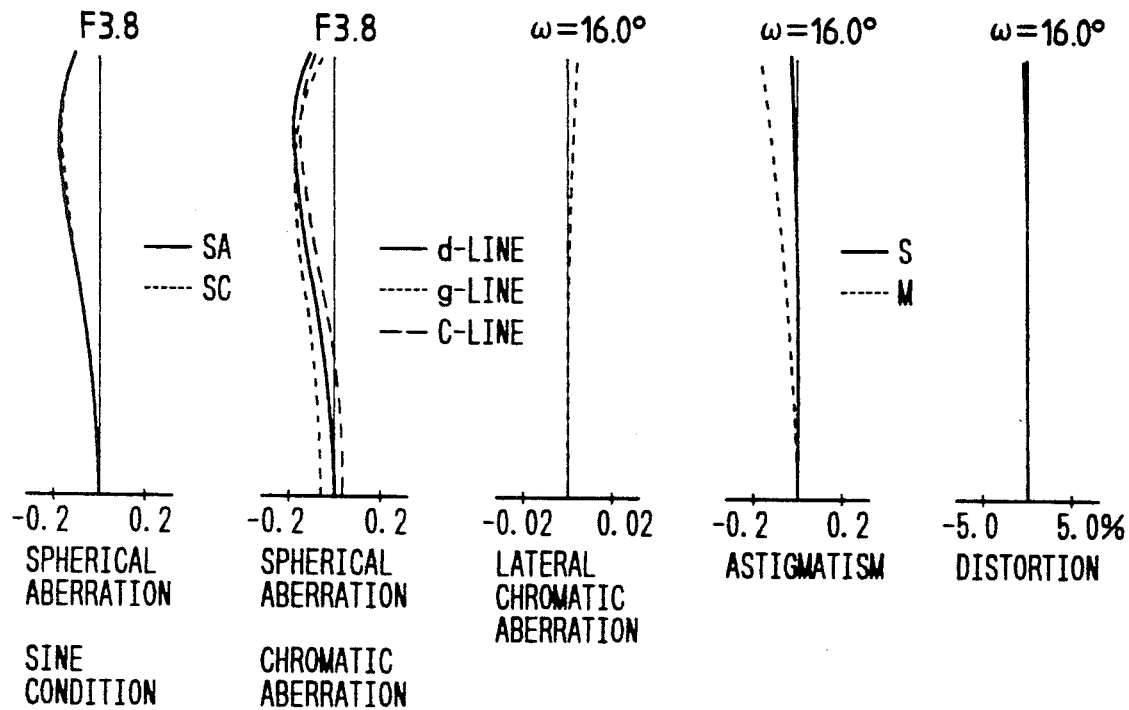
Figure 8:
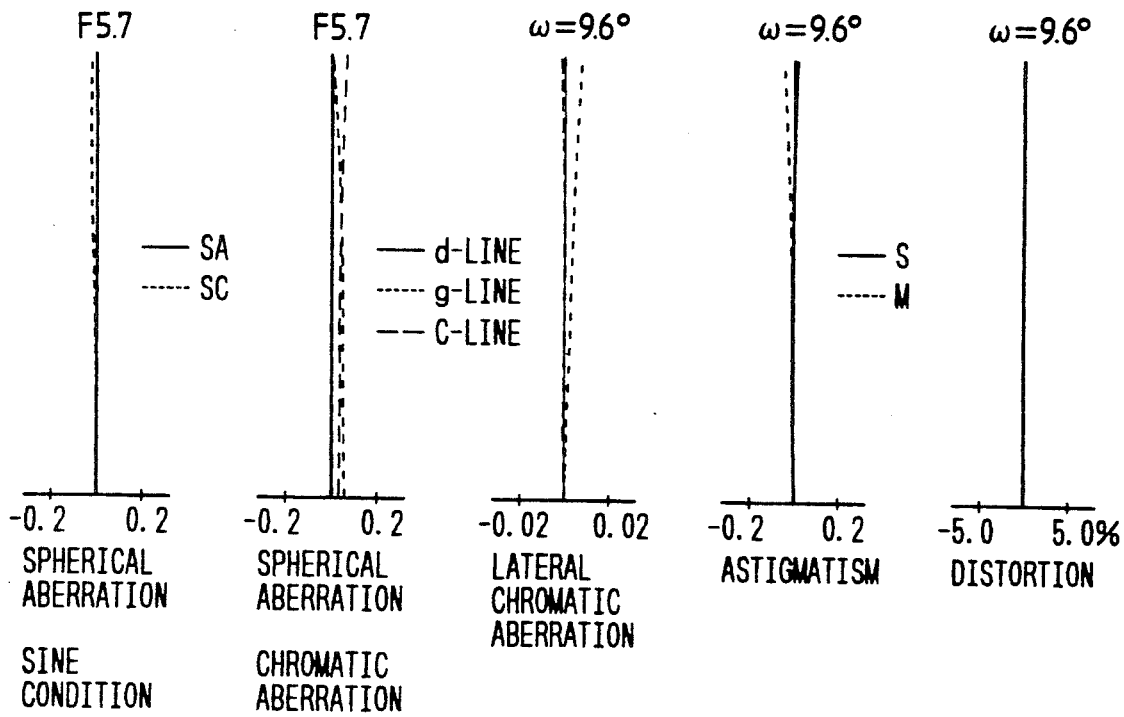

FIG. 5 is a simplified cross-sectional view of a zoom lens system according to Example 2 of the present invention. Numerical data for this lens system are shown in Table 2 below. FIG. 6 is a graph showing the aberration curves obtained with this lens system at the wide-angle end; FIG. 7 is a graph showing the aberration curves obtained at the middle-angle end; and FIG. 8 is a graph showing the aberration curves obtained at the telephoto end.

TABLE 2

$F_{NO} = 1:2.8-5.7$, $f = 8.15-23.50$.
$\omega = 27.2°-9.6°$

| Surface No. | r | d | n | νd |
|---|---|---|---|---|
| 1 | 13.118 | 0.80 | 1.83481 | 42.7 |
| 2 | 5.874 | 1.73 | | |
| 3 | −80.165 | 0.80 | 1.83400 | 37.2 |
| 4 | 13.226 | 0.60 | | |
| 5 | 10.200 | 1.55 | 1.80518 | 25.4 |
| 6 | 68.846 | variable | | |
| 7 | 10.249 | 1.93 | 1.51633 | 64.1 |
| 8 | −29.528 | 0.10 | | |
| 9 | 6.324 | 2.57 | 1.69680 | 55.5 |
| 10 | −11.976 | 1.73 | 1.83400 | 37.2 |
| 11 | 4.259 | 0.47 | | |
| 12 | 8.855 | 1.46 | 1.62280 | 57.1 |
| 13 | 236.875 | variable | | |
| 14 | ∞ | 5.00 | 1.51633 | 64.1 |
| 15 | ∞ | | | |

The values of d6 and d13 will vary as follows.

| $F_{NO}$ | 1:2.8 | 1:3.8 | 1:5.7 |
|---|---|---|---|
| f | 8.15 | 14.00 | 23.50 |
| ω | 27.2° | 16.0° | 9.6° |
| d6 | 13.92 | 6.62 | 2.50 |
| d13 | 7.73 | 12.48 | 20.20 |

EXAMPLE 3

Figure 9:
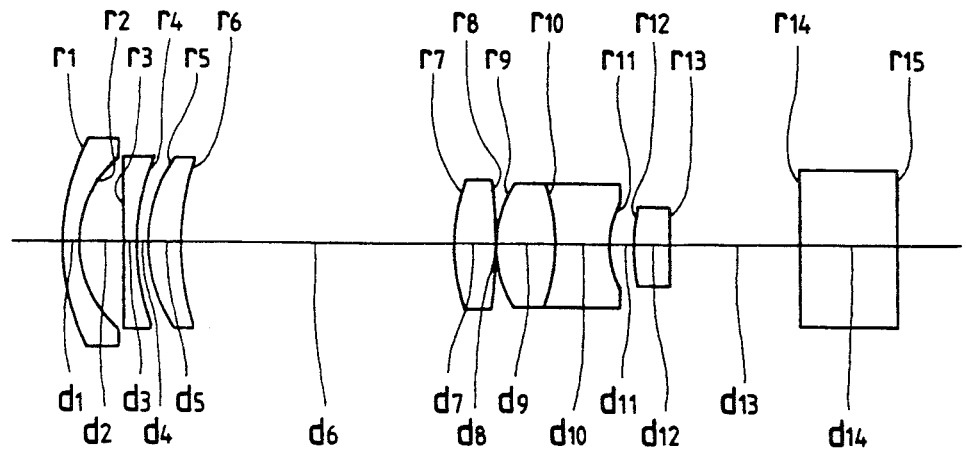
Figure 10:
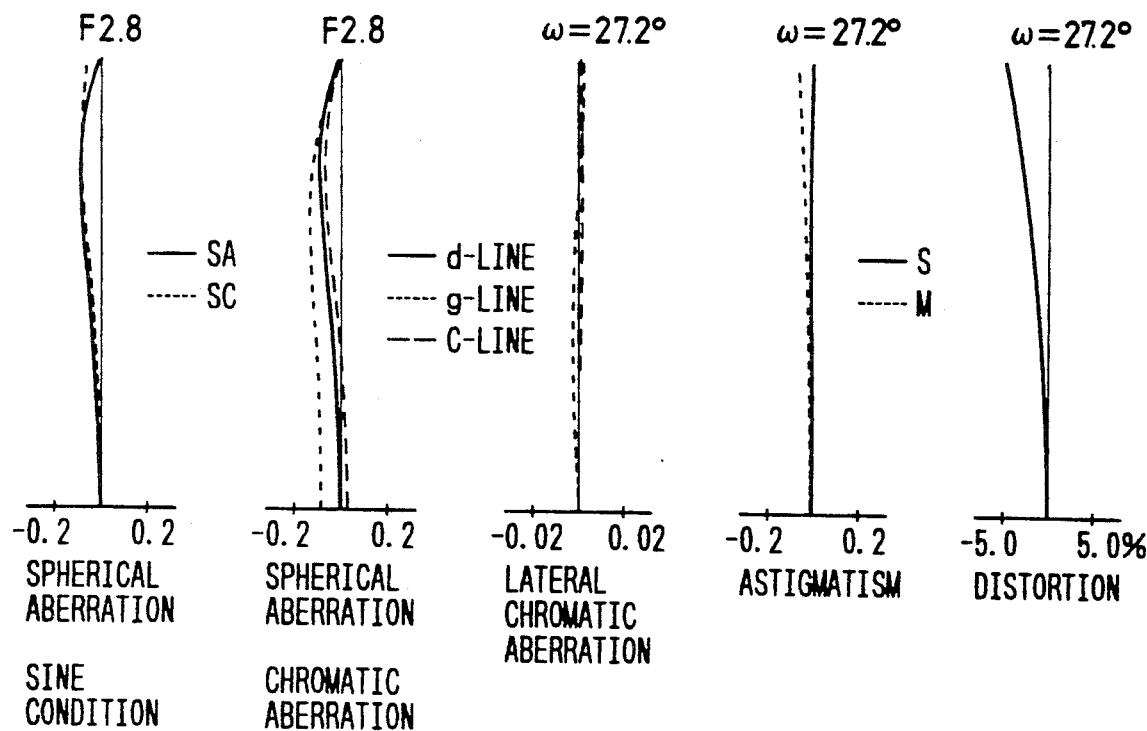
Figure 11:
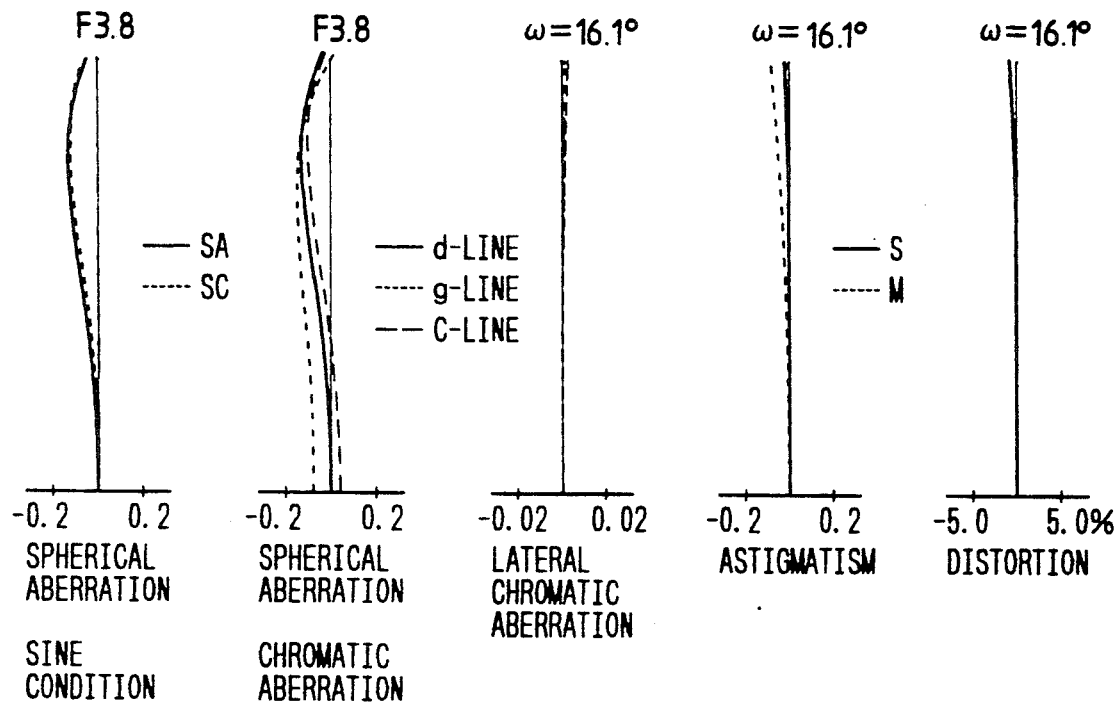
Figure 12:
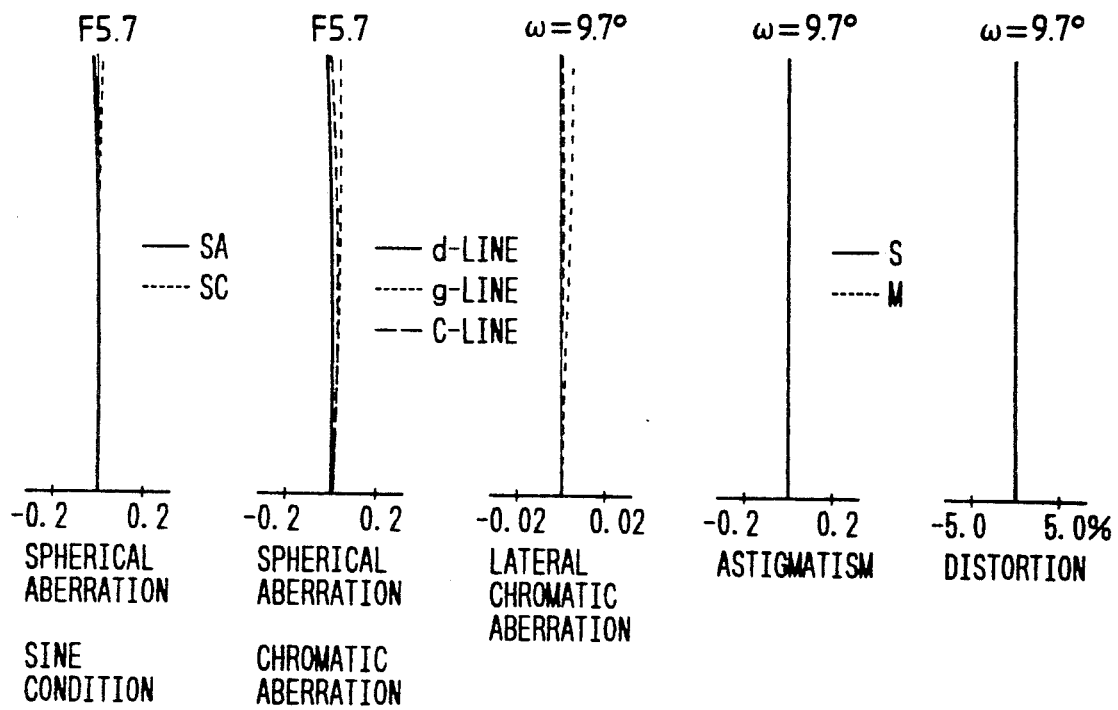

FIG. 9 is a simplified cross-sectional view of a zoom lens system according to Example 3 of the present invention. Numerical data for this lens system are shown in Table 3 below. FIG. 10 is a graph showing the aberration curves obtained with this lens system at the wide-angle end; FIG. 11 is a graph showing the aberration curves obtained at the middle-angle end; and FIG. 12 is a graph showing the aberration curves obtained at the telephoto end.

TABLE 3

$F_{NO} = 1:2.8-5.7$, $f = 8.15-23.50$.
$\omega = 27.2°-9.7°$

| Surface No. | r | d | n | νd |
|---|---|---|---|---|
| 1 | 12.434 | 0.80 | 1.77250 | 49.6 |
| 2 | 6.091 | 2.15 | | |
| 3 | 85.450 | 0.80 | 1.72000 | 50.3 |
| 4 | 12.163 | 0.62 | | |
| 5 | 8.212 | 1.64 | 1.80518 | 25.4 |
| 6 | 12.642 | variable | | |
| 7 | 10.079 | 2.06 | 1.51633 | 64.1 |
| 8 | −32.236 | 0.10 | | |
| 9 | 6.784 | 2.88 | 1.65830 | 57.3 |
| 10 | −9.649 | 2.68 | 1.83400 | 37.2 |
| 11 | 4.570 | 1.16 | | |
| 12 | 9.401 | 1.75 | 1.70000 | 48.1 |
| 13 | −73.048 | variable | | |
| 14 | ∞ | 5.00 | 1.51633 | 64.1 |
| 15 | ∞ | | | |

The values of d6 and d13 will vary as follows.

| $F_{NO}$ | 1:2.8 | 1:3.8 | 1:5.7 |
|---|---|---|---|
| f | 8.15 | 14.00 | 23.50 |
| ω | 27.2° | 16.1° | 9.7° |
| d6 | 13.61 | 6.51 | 2.50 |
| d13 | 6.44 | 11.29 | 19.18 |

EXAMPLE 4

Figure 13:
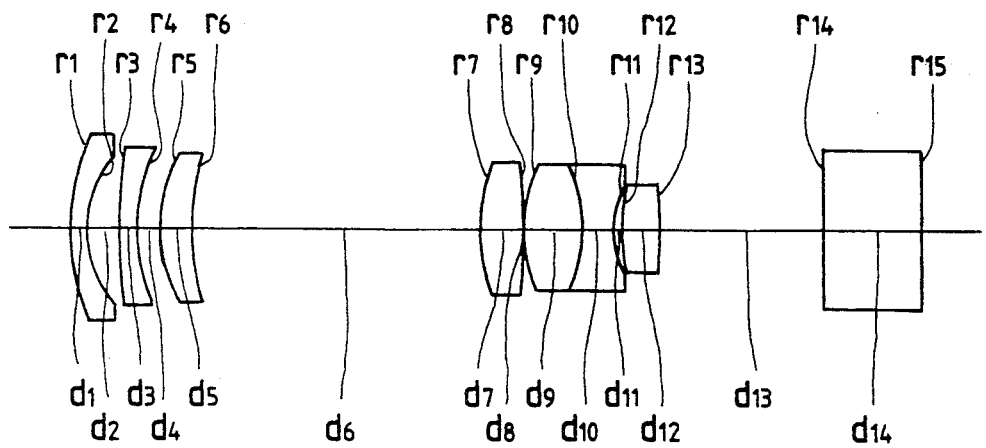
Figure 14:
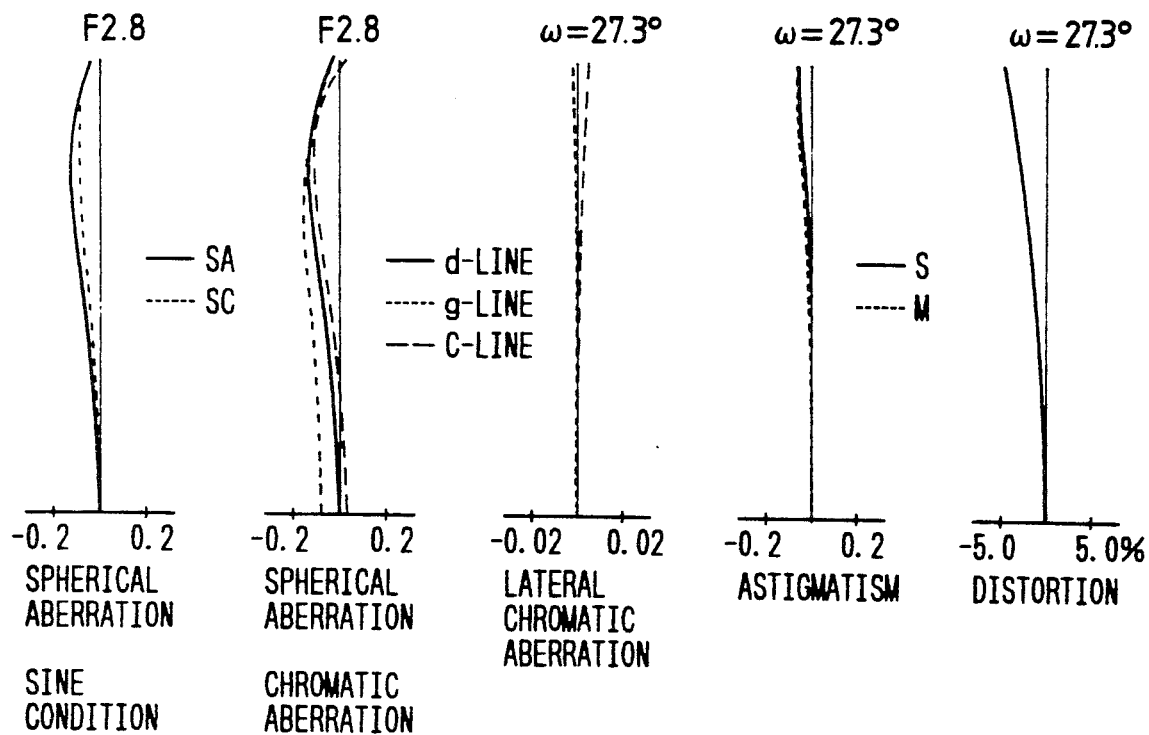
Figure 15:
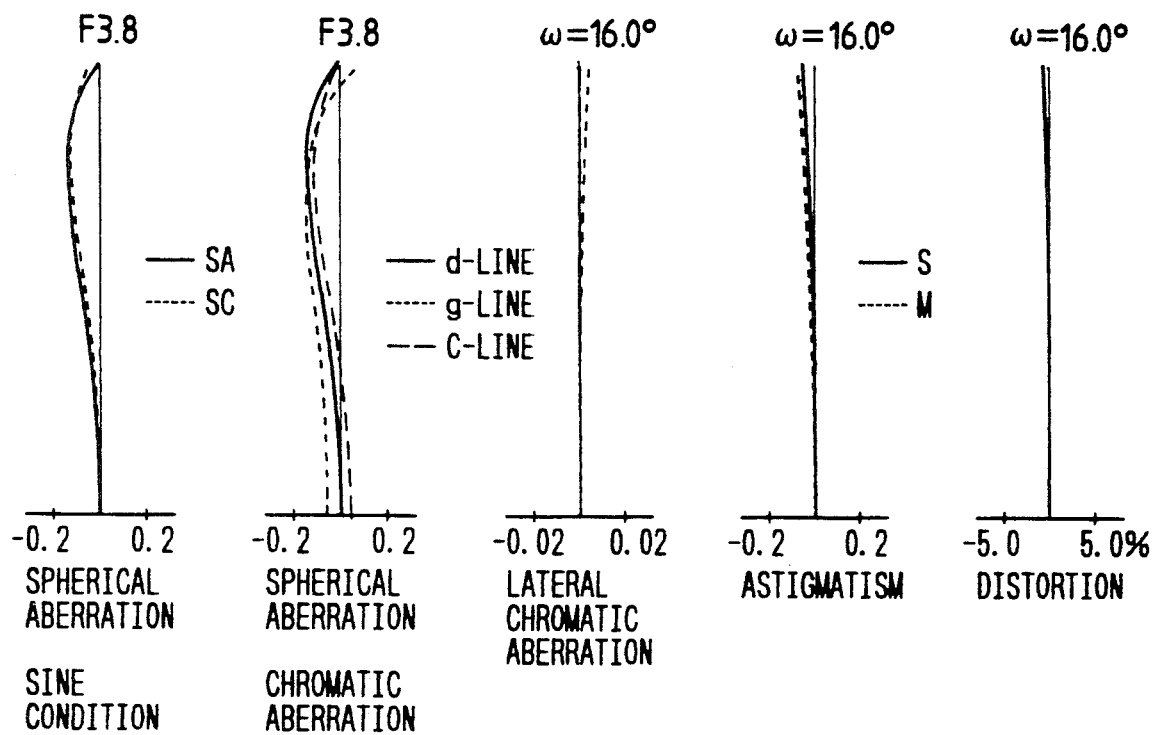
Figure 16:
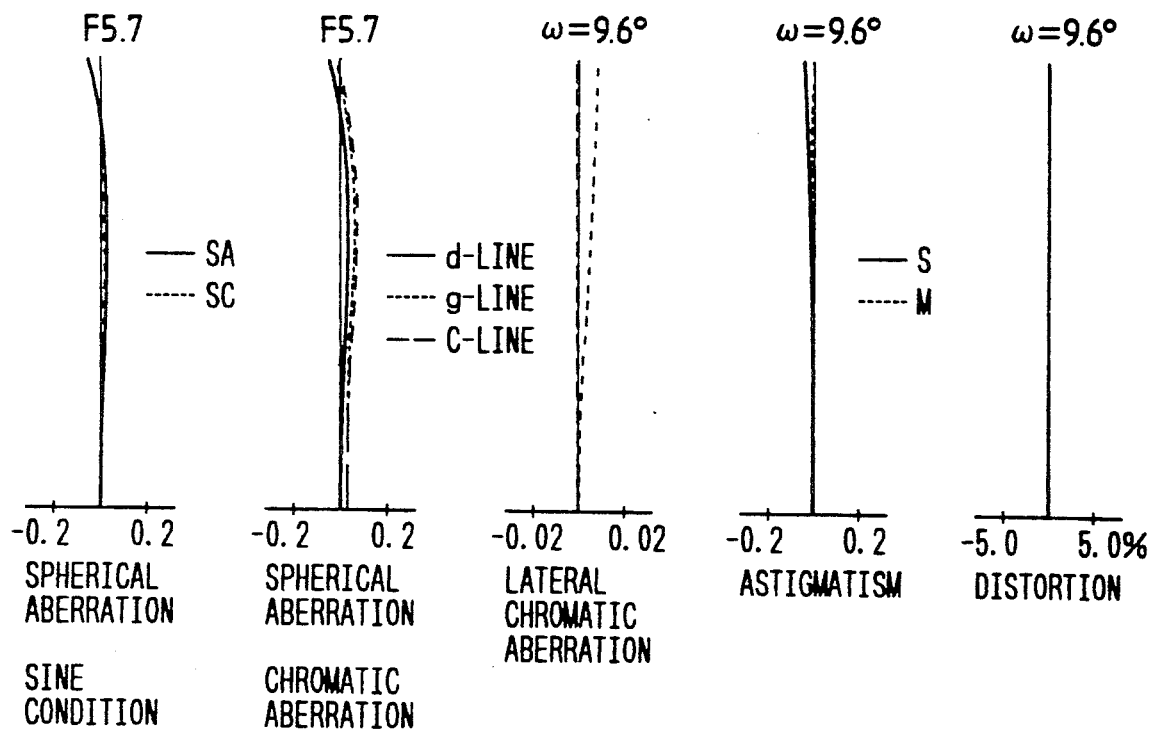

FIG. 13 is a simplified cross-sectional view of a zoom lens system according to Example 4 of the present invention. Numerical data for this lens system are shown in Table 4 below. FIG. 14 is a graph showing the aberration curves obtained with this lens system at the wide-angle end; FIG. 15 is a graph showing the aberration curves obtained at the middle-angle end; and FIG. 16 is a graph showing the aberration curves obtained at the telephoto end.

TABLE 4

$F_{NO} = 1:2.8-5.7$, $f = 8.15-23.50$.
$\omega = 27.3°-9.6°$

| Surface No. | r | d | n | νd |
|---|---|---|---|---|
| 1 | 11.351 | 0.80 | 1.83481 | 42.7 |
| 2 | 6.437 | 1.70 | | |
| 3 | 38.817 | 0.80 | 1.77250 | 49.6 |
| 4 | 8.806 | 1.26 | | |
| 5 | 8.481 | 1.58 | 1.80518 | 25.4 |
| 6 | 14.881 | variable | | |
| 7 | 8.882 | 2.11 | 1.55963 | 61.2 |
| 8 | −62.753 | 0.10 | | |
| 9 | 7.849 | 2.90 | 1.67790 | 55.3 |
| 10 | −7.864 | 1.59 | 1.83400 | 37.2 |
| 11 | 5.228 | 0.43 | | |
| 12 | 11.419 | 1.81 | 1.62012 | 49.6 |
| 13 | −25.228 | variable | | |
| 14 | ∞ | 5.00 | 1.51633 | 64.1 |
| 15 | ∞ | | | |

The values of d6 and d13 will vary as follows.

| $F_{NO}$ | 1:2.8 | 1:3.8 | 1:5.7 |
|---|---|---|---|
| f | 8.15 | 14.00 | 23.50 |
| ω | 27.3° | 16.0° | 9.6° |
| d6 | 14.36 | 6.78 | 2.50 |
| d13 | 8.18 | 13.07 | 21.00 |

EXAMPLE 5

Figure 17:
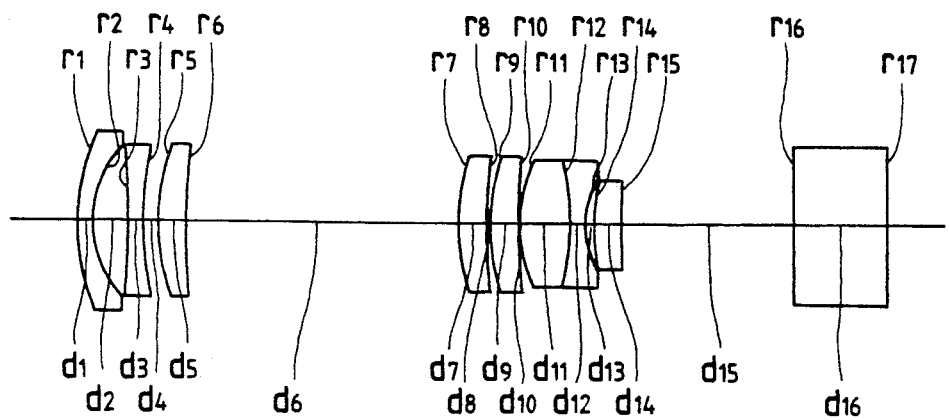
Figure 18:
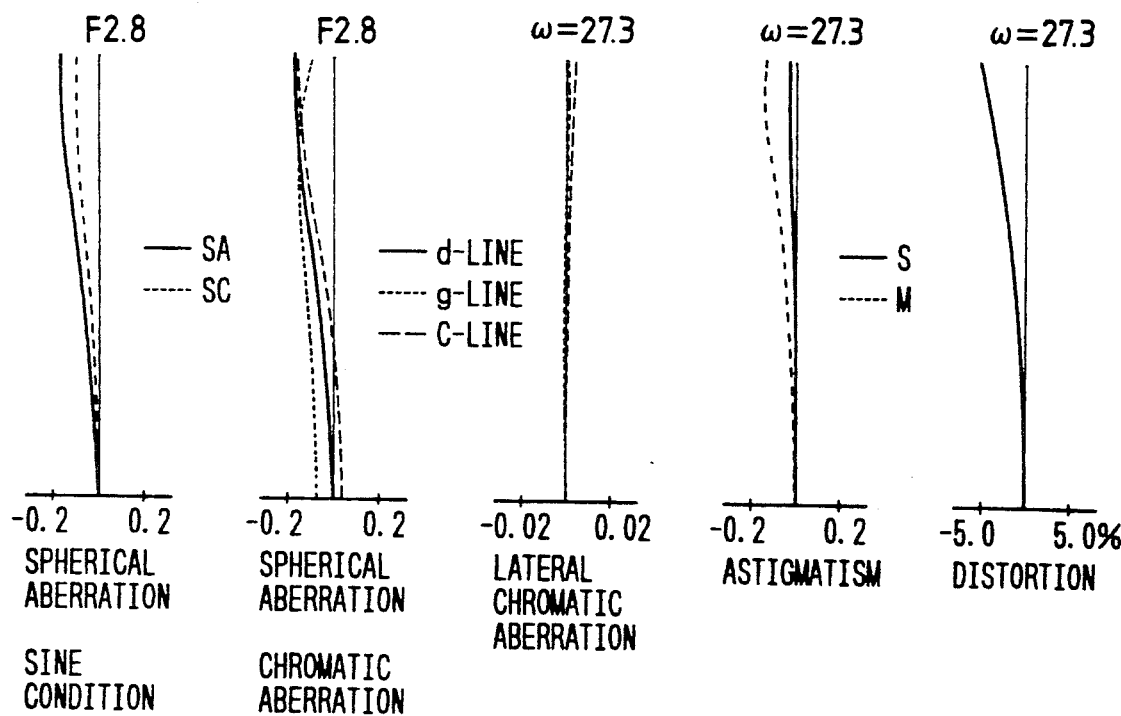
Figure 19:
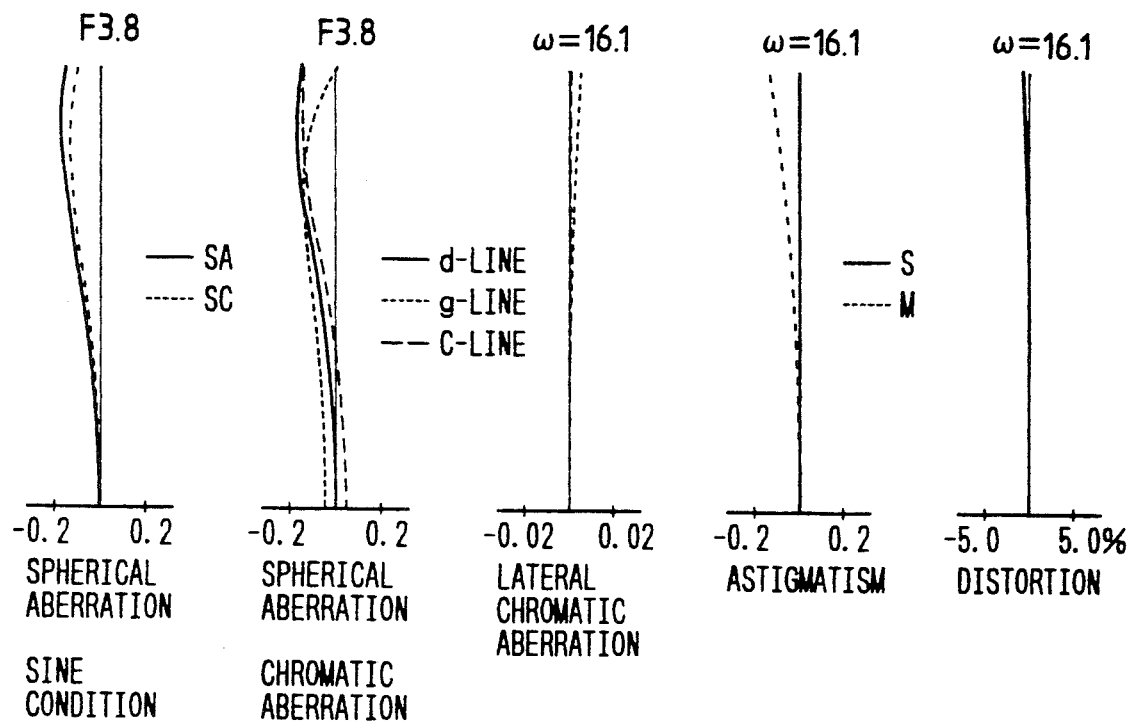
Figure 20:
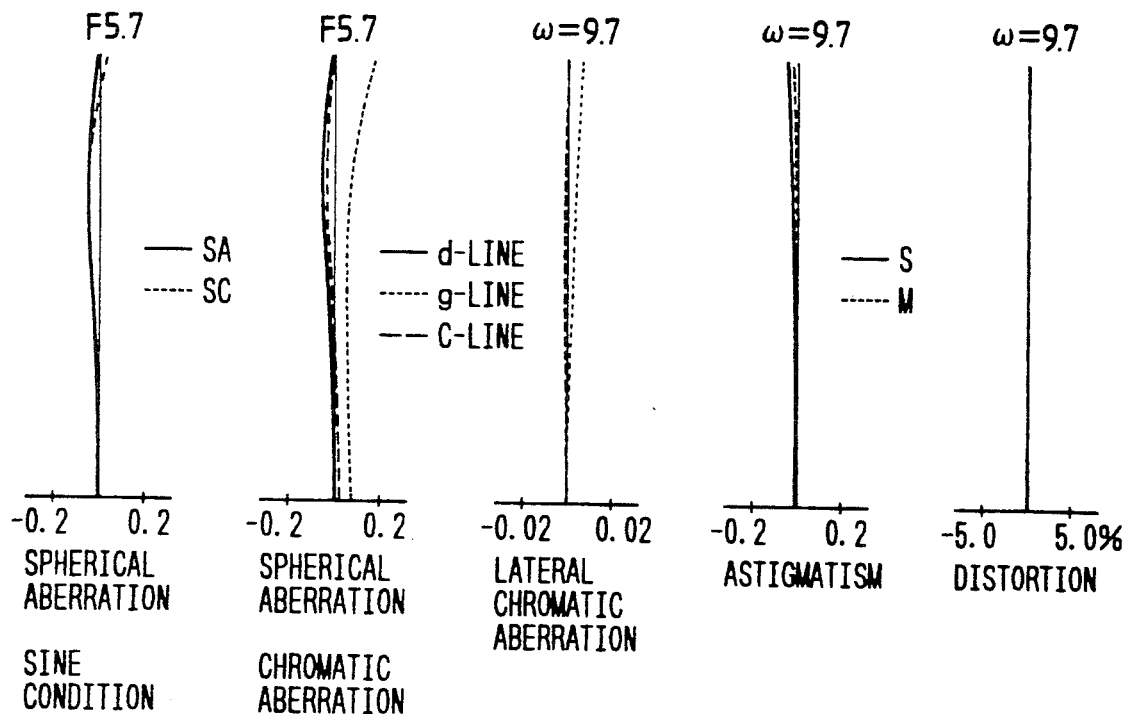

FIG. 17 is a simplified cross-sectional view of a zoom lens system according to Example 5 of the present invention. Numerical data for this lens system are shown in Table 5 below. FIG. 18 is a graph showing the aberration curves obtained with this lens system at the wide-angle end; FIG. 19 is a graph showing the aberration curves obtained at the middle-angle end; and FIG. 20 is a graph showing the aberration curves obtained at the telephoto end.

TABLE 5

$F_{NO} = 1:2.8-5.7$, $f = 8.15-23.50$.
$\omega = 27.3°-9.7°$

| Surface No. | r | d | n | νd |
|---|---|---|---|---|
| 1 | 11.573 | 0.80 | 1.83481 | 42.7 |
| 2 | 5.811 | 1.81 | | |
| 3 | −76.111 | 0.80 | 1.83481 | 42.7 |
| 4 | 14.730 | 0.79 | | |
| 5 | 10.242 | 1.45 | 1.80518 | 25.4 |
| 6 | 32.510 | variable | | |
| 7 | 12.020 | 1.45 | 1.62299 | 58.1 |
| 8 | 32.842 | 0.20 | | |
| 9 | 11.330 | 1.44 | 1.65100 | 56.1 |
| 10 | 26.752 | 0.10 | | |
| 11 | 6.993 | 2.58 | 1.65844 | 50.9 |
| 12 | −13.637 | 0.80 | 1.71736 | 29.5 |
| 13 | 4.380 | 0.41 | | |
| 14 | 8.940 | 1.48 | 1.67270 | 32.1 |
| 15 | 72.840 | variable | | |
| 16 | ∞ | 5.00 | 1.51633 | 64.1 |

The values of d6 and d13 will vary as follows.

| $F_{NO}$ | 1:2.8 | 1:3.9 | 1:5.7 |
|---|---|---|---|
| f | 8.15 | 14.00 | 23.50 |
| ω | 27.3° | 16.1° | 9.7° |
| d6 | 14.12 | 6.69 | 2.50 |
| d15 | 8.85 | 13.87 | 22.03 |

EXAMPLE 6

Figure 21:
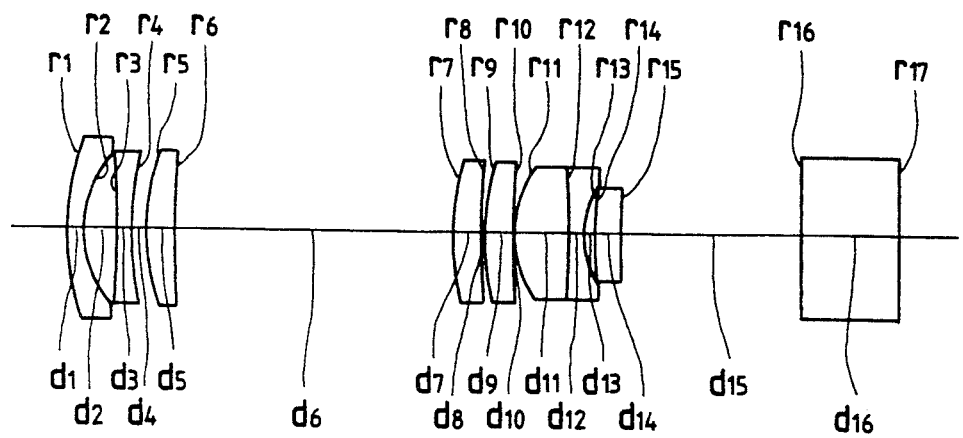
Figure 22:
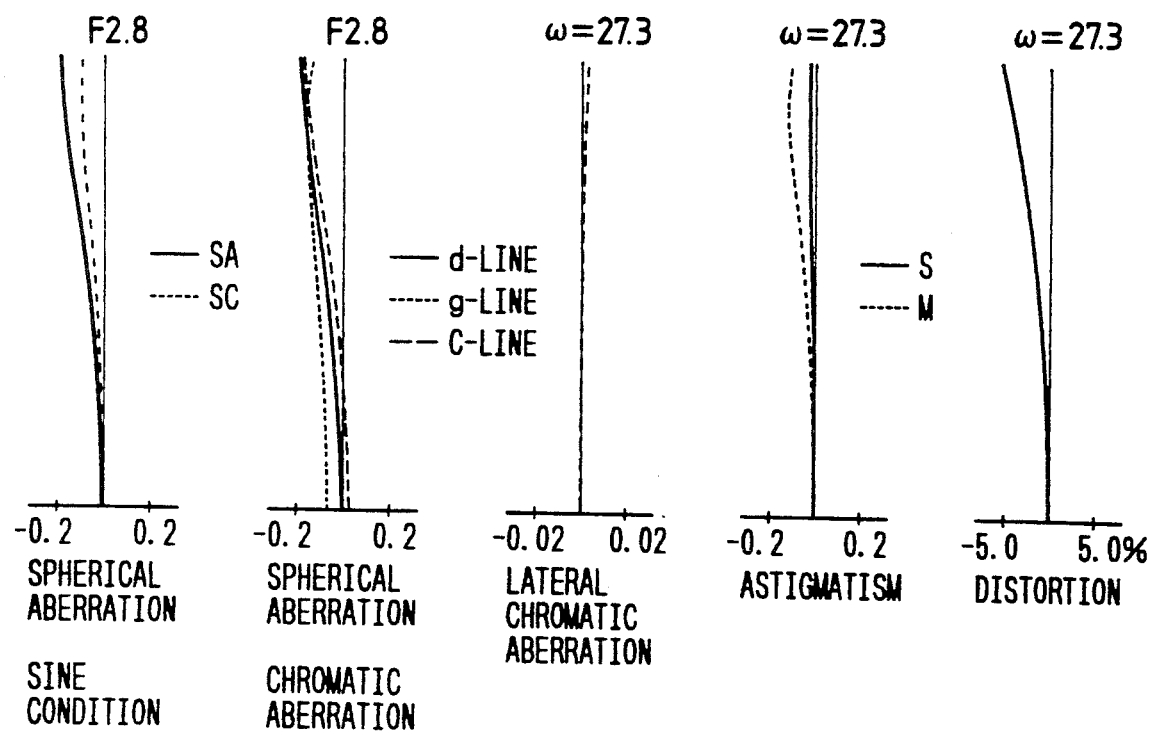
Figure 23:
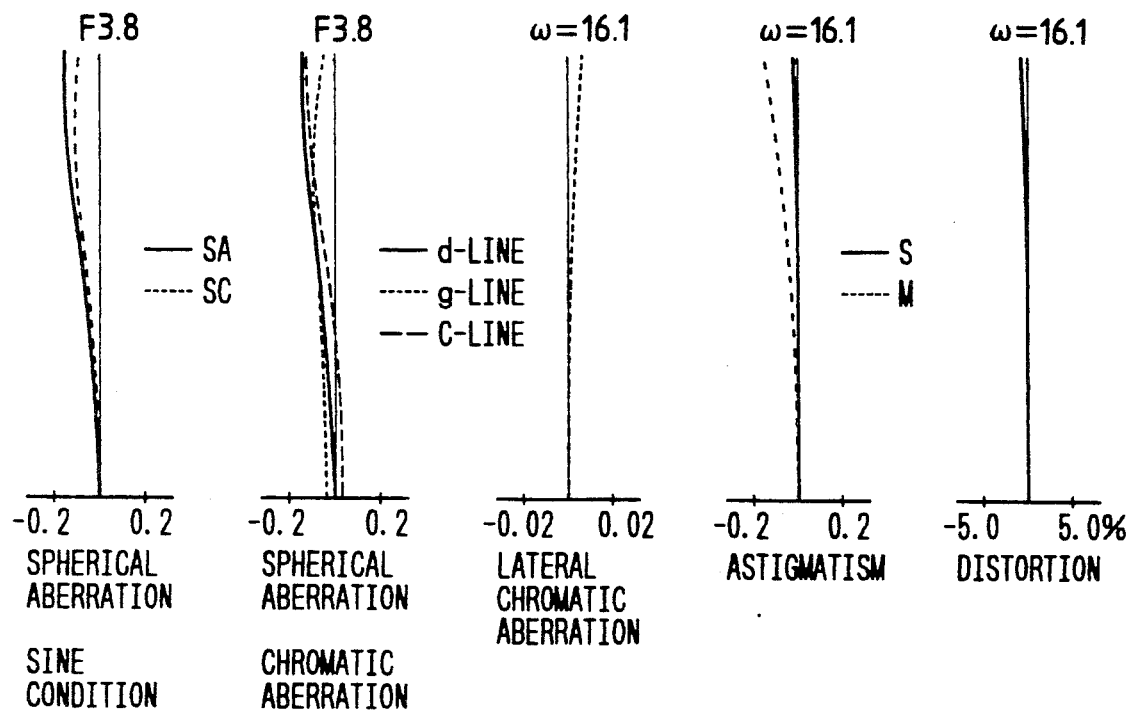
Figure 24:
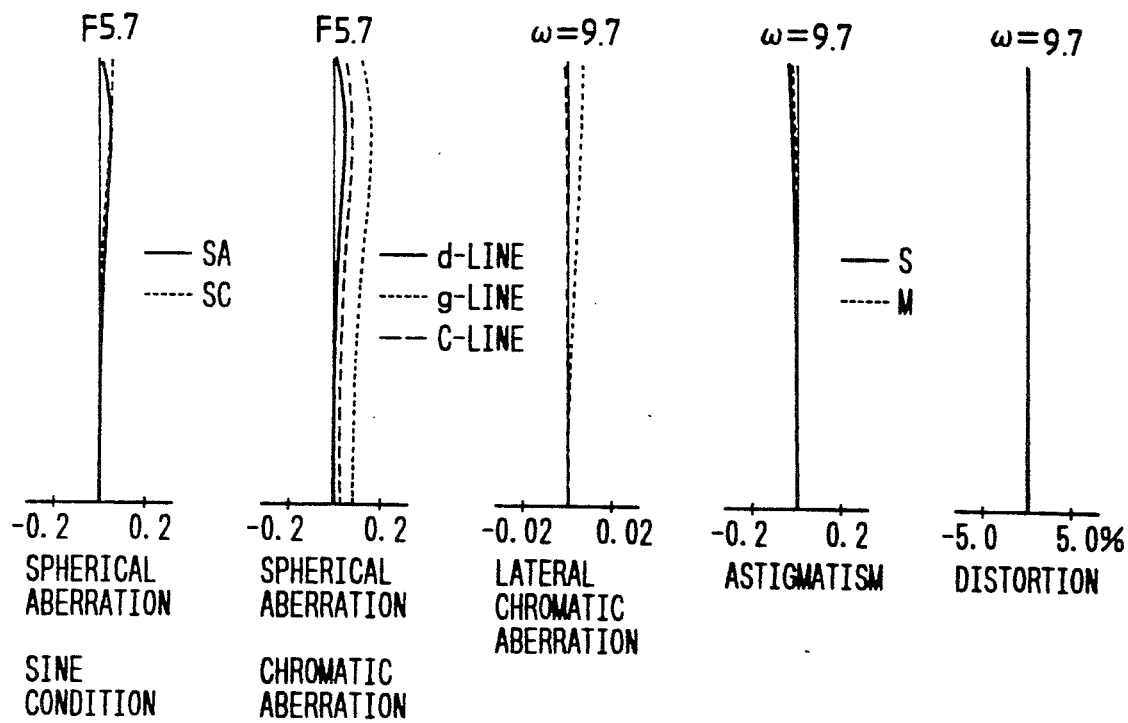

FIG. 21 is a simplified cross-sectional view of a zoom lens system according to Example 6 of the present invention. Numerical data for this lens system are shown in Table 6 below. FIG. 22 is a graph showing the aberration curves obtained with this lens system at the wide-angle end; FIG. 23 is a graph showing the aberration curves obtained at the middle-angle end; and FIG. 24 is a graph showing the aberration curves obtained at the telephoto end.

TABLE 6

$F_{NO} = 1:2.8-5.7$, $f = 8.15-23.50$,
$\omega = 27.4°-9.7°$

| Surface No. | r | d | n | vd |
|---|---|---|---|---|
| 1 | 14.139 | 0.80 | 1.83481 | 42.7 |
| 2 | 6.043 | 1.67 | | |
| 3 | −131.962 | 0.80 | 1.83481 | 42.7 |
| 4 | 14.533 | 0.79 | | |
| 5 | 10.420 | 1.47 | 1.80518 | 25.4 |
| 6 | 39.581 | variable | | |
| 7 | 14.089 | 1.39 | 1.62299 | 58.1 |
| 8 | 37.641 | 0.20 | | |
| 9 | 13.928 | 1.47 | 1.65100 | 56.1 |
| 10 | 68.598 | 0.10 | | |
| 11 | 6.341 | 2.66 | 1.60729 | 59.4 |
| 12 | −60.901 | 0.80 | 1.72825 | 28.5 |
| 13 | 4.409 | 0.41 | | |
| 14 | 9.784 | 1.47 | 1.67270 | 32.1 |
| 15 | 95.335 | variable | | |
| 16 | ∞ | 5.00 | 1.51633 | 64.1 |

The values of d6 and d13 will vary as follows.

| $F_{NO}$ | 1:2.8 | 1:3.9 | 1:5.7 |
|---|---|---|---|
| f | 8.15 | 14.00 | 23.50 |
| ω | 27.4° | 16.1° | 9.7° |
| d6 | 14.25 | 6.73 | 2.50 |
| d15 | 9.13 | 14.25 | 22.56 |

Numerical Data for Examples 1–6 as Related to Conditions (a)–(e)

Table 7 shows the numerical data for Examples 1–6 as related to conditions (a)–(e).

TABLE 7

| Condition | Example 1 | Example 2 | Example 3 |
|---|---|---|---|
| (a) $n_N - n_P$ | 0.114 | 0.137 | 0.176 |
| (b) $\nu_P - \nu_N$ | 13.1 | 18.3 | 20.1 |
| (c) $|r_C/f_2|$ | 0.806 | 1.113 | 0.899 |
| (d) $|f_1/f_w|$ | 1.436 | 1.625 | 1.585 |
| (e) (n1 − n2)/2 | 1.83481 | 1.83441 | 1.74625 |

| Condition | Example 4 | Example 5 | Example 6 |
|---|---|---|---|
| (a) $n_N - n_P$ | 0.156 | 0.0587 | 0.121 |
| (b) $\nu_P - \nu_N$ | 18.1 | 21.4 | 30.9 |
| (c) $|r_C/f_2|$ | 0.707 | 1.222 | 5.377 |
| (d) $|f_1/f_w|$ | 1.633 | 1.594 | 1.588 |
| (e) (n1 − n2)/2 | 1.80366 | 1.83481 | 1.83481 |

As described on the foregoing pages, the present invention provides a zoom lens system of a simple "two-group" configuration that is capable of achieving zooming up to a ratio of about 3 while exhibiting satisfactory optical performance.

We claim:

1. A zoom lens system that comprises, in order from the object side, a first lens group that includes at least three lens elements and that has a negative overall power and a second lens group that includes at least four lens elements, said second lens group being composed of, in order from the object side, a positive lens unit, a cemented lens having a positive lens element and a negative lens element, and a positive lens element, said second lens group element having a positive overall power, said zoom lens system being capable of changing its focal length by adjusting the overall distance between the first and the second lens groups to achieve a zoom ratio greater than 2.5, and said zoom lens system satisfying the following conditions (a) and (b):

$$0.05 < n_W - n_P < 0.25 \quad \text{(a)}$$

$$10 < \nu_P - \nu_N < 35 \quad \text{(b)}$$

where $n_P$ is the refractive index at the d-line of the positive lens element of the cemented lens in the second lens group, $n_W$ is the refractive index at the d-line of the negative lens element of the cemented lens in the second lens group, $\nu_P$ is the Abbe number of the cemented positive lens element at the d-line, and $\nu_N$ is the Abbe number of the cemented negative lens element at the d-line.

2. The zoom lens system according to claim 1 which further satisfies the following condition (c):

$$0.5 < |r_C/f_2| < 10 \quad \text{(c)}$$

where f2 is the focal length of the second lens group and $r_C$ is the radius of curvature of the interface between the positive and negative lens elements of the cemented lens in the second lens group.

3. The zoom lens system according to claim 1 wherein the first lens group comprises, in order from the object side, a negative meniscus lens element having a convex surface directed toward the object, a negative lens element and a positive lens element, said second lens group comprising, in order from the object side close to the first lens group, a positive lens unit, a cemented lens consisting of a positive and a negative lens element, and a positive lens element, said zoom lens system further satisfying the following conditions (d) and (e)

$$1.2 < |f_1/f_w| < 1.9$$

$$(n1 + n2)/2 < 1.7$$

where $f_W$ is the focal length of the overall system at the wide-angle end, f1 is the focal length of the first lens group, and n1 and n2 are the refractive indices at the d-line of the two negative lens elements in the first lens group, with n1 referring to the lens element which is the closer to the object.

4. The zoom lens system according to claim 1 wherein the cemented lens of said second lens group is composed of a positive and a negative element and has a negative focal length.

* * * * *